United States Patent
Akkarakaran et al.

(10) Patent No.: US 10,333,755 B2
(45) Date of Patent: Jun. 25, 2019

(54) METHODS AND APPARATUS FOR REFERENCE SIGNAL DESIGN FOR INTERFERENCE CANCELLATION

(71) Applicant: QUALCOMM Incorporated, San Diego, CA (US)

(72) Inventors: Sony Akkarakaran, Poway, CA (US); Tao Luo, San Diego, CA (US); Arumugam Chendamarai Kannan, San Diego, CA (US); Makesh Pravin John Wilson, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/680,565

(22) Filed: Aug. 18, 2017

(65) Prior Publication Data
US 2018/0234277 A1  Aug. 16, 2018

Related U.S. Application Data

(60) Provisional application No. 62/459,552, filed on Feb. 15, 2017.

(51) Int. Cl.
H04W 4/00    (2018.01)
H04B 1/04    (2006.01)
(Continued)

(52) U.S. Cl.
CPC ........ *H04L 27/2613* (2013.01); *H04J 11/005* (2013.01); *H04J 11/0053* (2013.01);
(Continued)

(58) Field of Classification Search
None
See application file for complete search history.

(56) References Cited

U.S. PATENT DOCUMENTS 9,253,771 B2  2/2016  Miao et al.
9,258,095 B2  2/2016  Zhang et al.
(Continued)

FOREIGN PATENT DOCUMENTS

WO   WO-2014126519 A1   8/2014
WO   WO-2015115991 A1   8/2015

OTHER PUBLICATIONS

ETRI: "On DMRS based Interference Cancellation Receiver and its Signalling," 3GPP Draft; R1-140220, 3rd Generation Partnership Project (3GPP), Mobile Competence Centre; 650, Route Des Lucioles; F-06921, Sophia-Antipolis Cedex; France, vol. RAN WG1, No. Prague, Czech Republic; Feb. 10, 2014-Feb. 14, 2014, Feb. 9, 2014, 3 pages, XP050735774, Retrieved from the Internet: URL: http://www.3gpp.org/ftp/Meetings_3GPP_SYNC/RAN/RAN1/Docs/ [retrieved on Feb. 9, 2014].
(Continued)

*Primary Examiner* — Erika A Washington
(74) *Attorney, Agent, or Firm* — Norton Rose Fulbright LLP

(57) ABSTRACT

Methods and apparatus for reference signal design are provided. In some aspects, a base station determines one or more of: a demodulation reference signal (DMRS) sequence or a DMRS location pattern, based on at least one of a plurality of transmission characteristics, and transmits one or more of the determined DMRS sequence or the determined DMRS location pattern. In further aspects, a user equipment identifies one or more of: a demodulation reference signal (DMRS) sequence or a DMRS location pattern from a base station, determines at least one of a plurality of transmission characteristics of the first base station based on one or more of: the identified DMRS sequence or the identified DMRS location pattern, and performs interference cancellation for transmissions from the base station.

30 Claims, 7 Drawing Sheets

(51) Int. Cl.
   *H04L 27/26* (2006.01)
   *H04L 5/00* (2006.01)
   *H04W 72/04* (2009.01)
   *H04J 11/00* (2006.01)

(52) U.S. Cl.
   CPC .......... *H04L 5/0035* (2013.01); *H04L 5/0051* (2013.01); *H04L 5/0073* (2013.01); *H04L 27/261* (2013.01); *H04L 27/262* (2013.01); *H04W 72/0426* (2013.01); *H04L 5/0048* (2013.01)

(56) References Cited

U.S. PATENT DOCUMENTS

| | | |
|---|---|---|
| 2012/0275414 A1 | 11/2012 | Hu et al. |
| 2015/0282192 A1 | 10/2015 | Shin et al. |
| 2015/0312917 A1* | 10/2015 | Farkas .................. H04J 11/005 370/329 |
| 2016/0182203 A1 | 6/2016 | Fang et al. |
| 2016/0262161 A1* | 9/2016 | Li ........................ H04J 11/0023 |
| 2016/0315748 A1* | 10/2016 | Chen ..................... H04L 5/0051 |

OTHER PUBLICATIONS

International Search Report and Written Opinion—PCT/US2018/014201—ISA/EPO—dated Jun. 8, 2018.
Qualcomm Incorporated: "Discussion on UL DMRS Design," 3GPP Draft; R1-1702615_Discussion on UL DMRS Design, 3rd Generation Partnership Project (3GPP), Mobile Competence Centre; 650, Route Des Lucioles; F-06921, Sophia-Antipolis Cedex; France, vol. RAN WG1, No. Athens; Feb. 13, 2017-Feb. 17, 2017, Feb. 12, 2017, 5 pages, XP051209768, Retrieved from the Internet: URL:http://www.3gpp.org/ftp/Meetings_3GPP_SYNC/RAN1/Docs/ [retrieved on Feb. 12, 2017].

* cited by examiner

METHODS AND APPARATUS FOR REFERENCE SIGNAL DESIGN FOR INTERFERENCE CANCELLATION

CROSS-REFERENCE TO RELATED APPLICATIONS

This application claims the benefit of U.S. Provisional Patent Application No. 62/459,552, entitled, "METHODS AND APPARATUS FOR REFERENCE SIGNAL DESIGN FOR INTERFERENCE CANCELLATION," filed on Feb. 15, 2017, the disclosure of which is hereby incorporated by reference herein in its entirety as if fully set forth below and for all applicable purposes.

TECHNICAL FIELD

Aspects of the present disclosure relate generally to wireless communication systems, and more particularly, to reference signal design. Certain embodiments of the technology discussed below can improve estimation of neighboring cell transmission characteristics and facilitate interference cancellation.

INTRODUCTION

Wireless communication networks are widely deployed to provide various communication services such as voice, video, packet data, messaging, broadcast, and the like. These wireless networks may be multiple-access networks capable of supporting multiple users by sharing the available network resources. Such networks, which are usually multiple access networks, support communications for multiple users by sharing the available network resources.

A wireless communication network may include a number of base stations or node Bs that can support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

Accordingly, a UE may estimate transmission characteristics of a neighboring base station based on its pilot signals. Pilot signals may include various forms of reference signals. Therefore, inefficient transmissions of reference signals by the neighboring base station may affect estimation of transmission characteristics of the neighboring base station by the UE. As a result, interference cancellation by the UE for transmissions from the neighboring base stations may suffer.

As the demand for mobile broadband access continues to increase, the possibilities of interference and congested networks grows with more UEs accessing the long-range wireless communication networks and more short-range wireless systems being deployed in communities. Research and development continue to advance wireless communication technologies not only to meet the growing demand for mobile broadband access, but to advance and enhance the user experience with mobile communications.

BRIEF SUMMARY OF SOME EMBODIMENTS

The following summarizes some aspects of the present disclosure to provide a basic understanding of the discussed technology. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

In one aspect of the disclosure, a method for wireless communication is provided. For example, a method can include determining, by a base station based on at least one transmission characteristic of the base station of a plurality of transmission characteristics of the base station, one or more of a demodulation reference signal (DMRS) sequence including at least one DMRS symbols or a DMRS location pattern including a set of resource elements. The method can further include transmitting, by the base station, a DMRS using at least one of the one or more determined DMRS sequence or the determined DMRS location pattern.

In an additional aspect of the disclosure, a method for wireless communication is provided. For example, a method can include identifying, by a user equipment (UE), one or more of: a demodulation reference signal (DMRS) sequence or a DMRS location pattern in a transmission from a first base station and determining, by the UE, at least one transmission characteristic of the first base station of a plurality of transmission characteristics of the first base station based on one or more of the identified DMRS sequence or the identified DMRS location pattern. The method can further include performing, by the UE, interference cancellation for transmissions from the first base station.

In an additional aspect of the disclosure, an apparatus configured for wireless communication is provided. For example, the apparatus can include means for determining, by a base station based on at least one transmission characteristic of the base station of a plurality of transmission characteristics of the base station, one or more of a demodulation reference signal (DMRS) sequence including at least one DMRS symbol or a DMRS location pattern including a set of resource elements. The apparatus can further include means for transmitting, by the base station, a DMRS using at least one of the one or more determined DMRS sequence or the determined DMRS location pattern.

In an additional aspect of the disclosure, an apparatus configured for wireless communication is provided. For example, the apparatus can include means for identifying, by a user equipment (UE), one or more of a demodulation reference signal (DMRS) sequence or a DMRS location pattern in a transmission from a first base station and means for determining, by the UE, at least one transmission characteristic of the first base station of a plurality of transmission characteristics of the first base station based on one or more of the identified DMRS sequence or the identified DMRS location pattern. The apparatus can further include means for performing, by the UE, interference cancellation for transmissions from the first base station.

In an additional aspect of the disclosure, a non-transitory computer-readable medium having program code recorded thereon is provided. The program code can include code to determine, by a base station based on at least one transmission characteristic of the base station of a plurality of transmission characteristics of the base station, one or more of a demodulation reference signal (DMRS) sequence including at least one DMRS symbol or a DMRS location pattern including a set of resource elements. The program code can further include code to transmit, by the base station, a DMRS using at least one of the one or more determined DMRS sequence or the determined DMRS location pattern.

In an additional aspect of the disclosure, a non-transitory computer-readable medium having program code recorded thereon is provided. The program code can include code to identify, by a user equipment (UE), one or more of: a demodulation reference signal (DMRS) sequence or a DMRS location pattern in a transmission from a first base station and to determine, by the UE, at least one transmission characteristic of the first base station of a plurality of transmission characteristics of the first base station based on one or more of the identified DMRS sequence or the identified DMRS location pattern. The program code can further include code to perform, by the UE, interference cancellation for transmissions from the first base station.

In an additional aspect of the disclosure, an apparatus configured for wireless communication is provided. The apparatus includes at least one processor, and a memory coupled to the processor. The at least one processor can be configured to determine, by a base station based on at least one transmission characteristic of the base station of a plurality of transmission characteristics of the base station, one or more of a demodulation reference signal (DMRS) sequence including at least one DMRS symbol or a DMRS location pattern including a set of resource elements. The at least one processor can further be configured to transmit, by the base station, a DMRS using at least one of the one or more determined DMRS sequence or the determined DMRS location pattern.

In an additional aspect of the disclosure, an apparatus configured for wireless communication is provided. The apparatus includes at least one processor, and a memory coupled to the processor. The at least one processor can be configured to identify, by a user equipment (UE), one or more of a demodulation reference signal (DMRS) sequence or a DMRS location pattern in a transmission from a first base station and to determine, by the UE, at least one transmission characteristic of the first base station of a plurality of transmission characteristics of the first base station based on one or more of the identified DMRS sequence or the identified DMRS location pattern. The at least one processor can further be configured to perform, by the UE, interference cancellation for transmissions from the first base station.

Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

DETAILED DESCRIPTION

Figure 1:
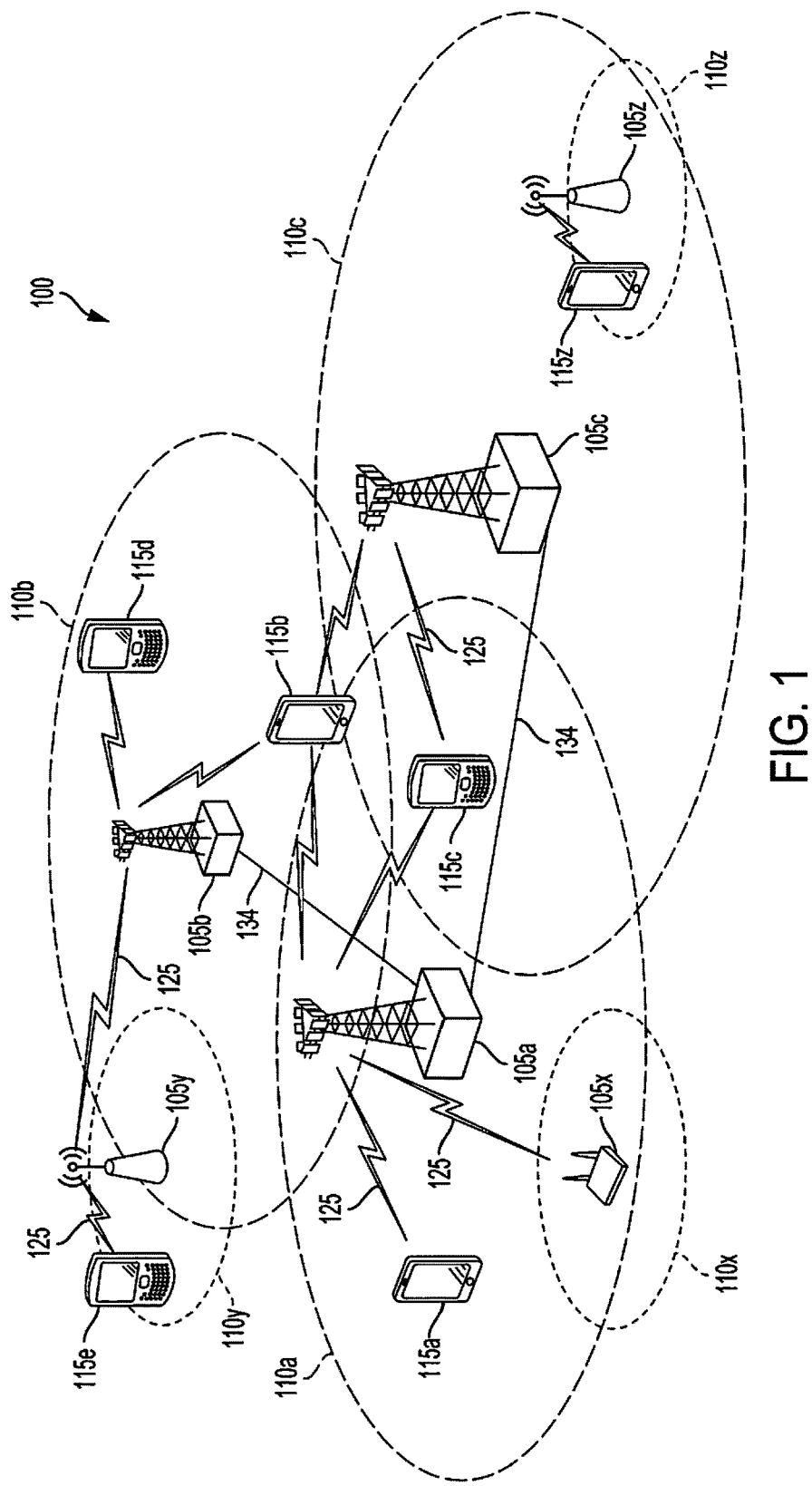
FIG. 1 is a block diagram illustrating details of a wireless communication system according to some embodiments of the present disclosure.

The detailed description set forth below, in connection with the appended drawings, is intended as a description of various possible configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

This disclosure relates generally to providing or participating in communication as between two or more wireless devices in one or more wireless communications systems, also referred to as wireless communications networks. In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, as well as other communications networks. As described herein, the terms "networks" and "systems" may be used interchangeably according to the particular context.

A CDMA network, for example, may implement a radio technology such as universal terrestrial radio access (UTRA), cdma2000, and the like. UTRA includes wideband-CDMA (W-CDMA) and low chip rate (LCR). CDMA2000 covers IS-2000, IS-95, and IS-856 standards.

A TDMA network may, for example implement a radio technology such as Global System for Mobile Communications (GSM). 3GPP defines standards for the GSM EDGE (enhanced data rates for GSM evolution) radio access network (RAN), also denoted as GERAN. GERAN is the radio component of GSM/EDGE, together with the network that joins the base stations (for example, the Ater and Abis interfaces) and the base station controllers (A interfaces, etc.). The radio access network represents a component of a GSM network, through which phone calls and packet data are routed from and to the public switched telephone network (PSTN) and Internet to and from subscriber handsets, also known as user terminals or user equipments (UEs). A mobile phone operator's network may comprise one or more GERANs, which may be coupled with UTRANs in the case of a UMTS/GSM network. An operator network may also include one or more LTE networks, and/or one or more other networks. The various different network types may use different radio access technologies (RATs) and radio access networks (RANs).

An OFDMA network may, for example, implement a radio technology such as evolved UTRA (E-UTRA), IEEE 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project aimed at improving the universal mobile telecommunications system (UMTS) mobile phone standard. The 3GPP may define specifications for the next generation of mobile networks, mobile systems, and mobile devices.

For clarity, certain aspects of the apparatus and techniques may be described below with reference to exemplary LTE implementations or in an LTE-centric way, and LTE terminology may be used as illustrative examples in portions of the description below; however, the description is not intended to be limited to LTE applications. Indeed, the present disclosure is concerned with shared access to wireless spectrum between networks using different radio access technologies or radio air interfaces.

Moreover, it should be understood that, in operation, wireless communication networks adapted according to the concepts herein may operate with any combination of licensed or unlicensed spectrum depending on loading and availability. Accordingly, it will be apparent to one of skill in the art that the systems, apparatus and methods described herein may be applied to other communications systems and applications than the particular examples provided.

FIG. 1 shows wireless network 100 for communication according to some embodiments. While discussion of the technology of this disclosure is provided relative to an LTE-A network (shown in FIG. 1), this is for illustrative purposes. Principles of the technology disclosed can be used in other network deployments, including fifth generation (5G) networks. As appreciated by those skilled in the art, components appearing in FIG. 1 are likely to have related counterparts in other network arrangements including, for example, cellular-style network arrangements and non-cellular-style-network arrangements (e.g., device to device or peer to peer or ad hoc network arrangements, etc.).

Turning back to FIG. 1 wireless network 100 includes a number of base stations, such as may comprise evolved node Bs (eNBs) or G node Bs (gNBs). These may be referred to as gNBs 105. A gNB may be a station that communicates with the UEs and may also be referred to as a base station, a node B, an access point, and the like. Each gNB 105 may provide communication coverage for a particular geographic area. In 3GPP, the term "cell" can refer to this particular geographic coverage area of a gNB and/or a gNB subsystem serving the coverage area, depending on the context in which the term is used. In implementations of wireless network 100 herein, gNBs 105 may be associated with a same operator or different operators (e.g., wireless network 100 may comprise a plurality of operator wireless networks), and may provide wireless communications using one or more of the same frequencies (e.g., one or more frequency band in licensed spectrum, unlicensed spectrum, or a combination thereof) as a neighboring cell.

A gNB may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A gNB for a macro cell may be referred to as a macro gNB. A gNB for a small cell may be referred to as a small cell gNB, a pico gNB, a femto gNB or a home gNB. In the example shown in FIG. 1, gNBs 105a, 105b and 105c are macro gNBs for the macro cells 110a, 110b and 110c, respectively. gNBs 105x, 105y, and 105z are small cell gNBs, which may include pico or femto gNBs that provide service to small cells 110x, 110y, and 110z, respectively. A gNB may support one or multiple (e.g., two, three, four, and the like) cells.

Wireless network 100 may support synchronous or asynchronous operation. For synchronous operation, the gNBs may have similar frame timing, and transmissions from different gNBs may be approximately aligned in time. For asynchronous operation, the gNBs may have different frame timing, and transmissions from different gNBs may not be aligned in time. In some scenarios, networks may be enabled or configured to handle dynamic switching between synchronous or asynchronous operations.

UEs 115a-115e and 115z are dispersed throughout wireless network 100, and each UE may be stationary or mobile. It should be appreciated that, although a mobile apparatus is commonly referred to as user equipment (UE) in standards and specifications promulgated by the 3rd Generation Partnership Project (3GPP), such apparatus may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. Within the present document, a "mobile" apparatus or UE need not necessarily have a capability to move, and may be stationary. Some non-limiting examples of a mobile apparatus, such as may comprise embodiments of one or more of UEs 115, include a mobile, a cellular (cell) phone, a smart phone, a session initiation protocol (SIP) phone, a laptop, a personal computer (PC), a notebook, a netbook, a smart book, a tablet, and a personal digital assistant (PDA). A mobile apparatus may additionally be an "Internet of things" (IoT) device such as an automotive or other transportation vehicle, a satellite radio, a global positioning system (GPS) device, a logistics controller, a drone, a multi-copter, a quad-copter, a smart energy or security device, a solar panel or solar array, municipal lighting, water, or other infrastructure; industrial automation and enterprise devices; consumer and wearable devices, such as eyewear, a wearable camera, a smart watch, a health or fitness tracker, a mammal implantable device, gesture tracking device, medical device, a digital audio player (e.g., MP3 player), a camera, a game console, etc.; and digital home or smart home devices such as a home audio, video, and multimedia device, an appliance, a sensor, a vending machine, intelligent lighting, a home security system, a smart meter, etc. A mobile apparatus, such as UEs 115, may be able to communicate with macro gNBs, pico gNBs, femto gNBs, relays, and the like. In FIG. 1, a lightning bolt (e.g., communication links 125) indicates wireless transmissions between a UE and a serving gNB, which is a gNB designated to serve the UE on the downlink and/or uplink, or desired transmission between gNBs. Although backhaul communication 134 is illustrated as wired backhaul communications that may occur between gNBs, it should be appreciated that backhaul communications may additionally or alternatively be provided by wireless communications.

Figure 2:
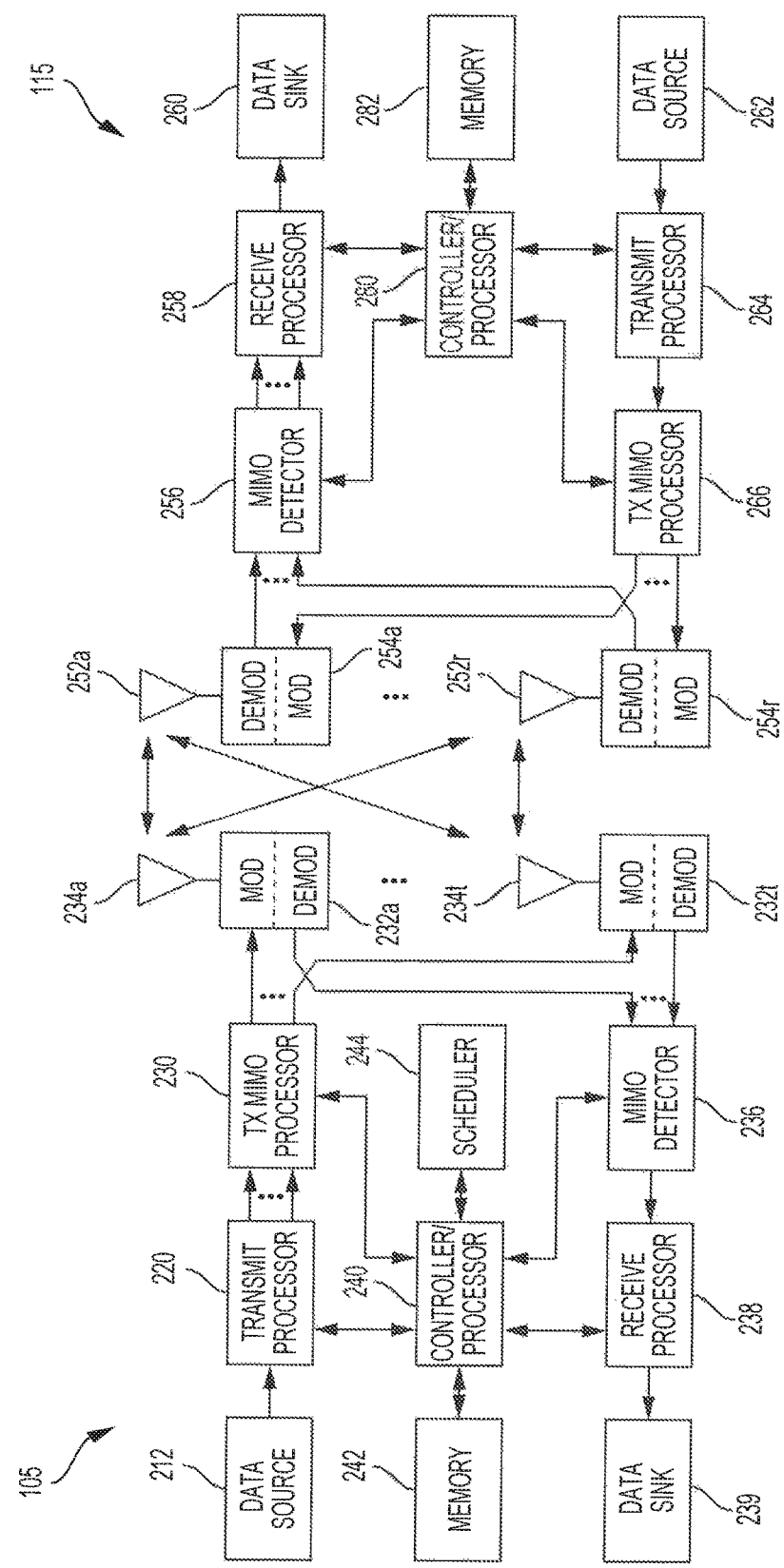
FIG. 2 is a block diagram conceptually illustrating a design of a base station/gNB and a UE configured according to some embodiments of the present disclosure.

FIG. 2 shows a block diagram of a design of base station/gNB 105 and UE 115. These can be one of the base stations/gNBs and one of the UEs in FIG. 1. For a restricted association scenario (as mentioned above), the gNB 105 may be small cell gNB 105z in FIG. 1, and UE 115 may be UE 115z, which in order to access small cell gNB 105z, would be included in a list of accessible UEs for small cell gNB 105z. gNB 105 may also be a base station of some other type. gNB 105 may be equipped with antennas 234a through 234t, and UE 115 may be equipped with antennas 252a through 252r.

At gNB 105, transmit processor 220 may receive data from data source 212 and control information from controller/processor 240. The control information may be for the physical broadcast channel (PBCH), physical control format indicator channel (PCFICH), physical hybrid-ARQ indicator channel) PHICH, physical downlink control channel (PDCCH), etc. The data may be for the physical downlink shared channel (PDSCH), etc. Transmit processor 220 may process (e.g., encode and symbol map) the data and control information to obtain data symbols and control symbols, respectively. Transmit processor 220 may also generate reference symbols, e.g., for the primary synchronization signal (PSS), secondary synchronization signal (SSS), and cell-specific reference signal (CRS). Transmit (TX) multiple-input multiple-output (MIMO) processor 230 may perform spatial processing (e.g., precoding) on the data symbols, the control symbols, and/or reference symbols, if applicable, and may provide output symbol streams to modulators (MODs) 232a through 232t. Each modulator 232 may process a respective output symbol stream (e.g., for OFDM, etc.) to obtain an output sample stream. Each modulator 232 may additionally or alternatively process (e.g., convert to analog, amplify, filter, and upconvert) the output sample stream to obtain a downlink signal. Downlink signals from modulators 232a through 232t may be transmitted via antennas 234a through 234t, respectively.

At UE 115, antennas 252a through 252r may receive the downlink signals from gNB 105 and may provide received signals to demodulators (DEMODs) 254a through 254r, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. MIMO detector 256 may obtain received symbols from all demodulators 254a through 254r, perform MIMO detection on the received symbols if applicable, and provide detected symbols. Receive processor 258 may process (e.g., demodulate, deinterleave, and decode) the detected symbols, provide decoded data for UE 115 to data sink 260, and provide decoded control information to controller/processor 280.

On the uplink, at UE 115, transmit processor 264 may receive and process data (e.g., for the PUSCH) from data source 262 and control information (e.g., for the PUCCH) from controller/processor 280. Transmit processor 264 may also generate reference symbols for a reference signal. The symbols from transmit processor 264 may be precoded by TX MIMO processor 266 if applicable, further processed by modulators 254a through 254r (e.g., for SC-FDM, etc.), and transmitted to gNB 105. At gNB 105, the uplink signals from UE 115 may be received by antennas 234, processed by demodulators 232, detected by MIMO detector 236 if applicable, and further processed by receive processor 238 to obtain decoded data and control information sent by UE 115. Processor 238 may provide the decoded data to data sink 239 and the decoded control information to controller/processor 240.

Controllers/processors 240 and 280 may direct the operation at gNB 105 and UE 115, respectively. Controller/processor 240 and/or other processors and modules at gNB 105 and/or controllers/processor 280 and/or other processors and modules at UE 115 may perform or direct the execution of various processes for the techniques described herein, such as to perform or direct the execution illustrated in FIGS. 4-7, and/or other processes for the techniques described herein. Memories 242 and 282 may store data and program codes for gNB 105 and UE 115, respectively. Scheduler 244 may schedule UEs for data transmission on the downlink and/or uplink.

Figure 3:
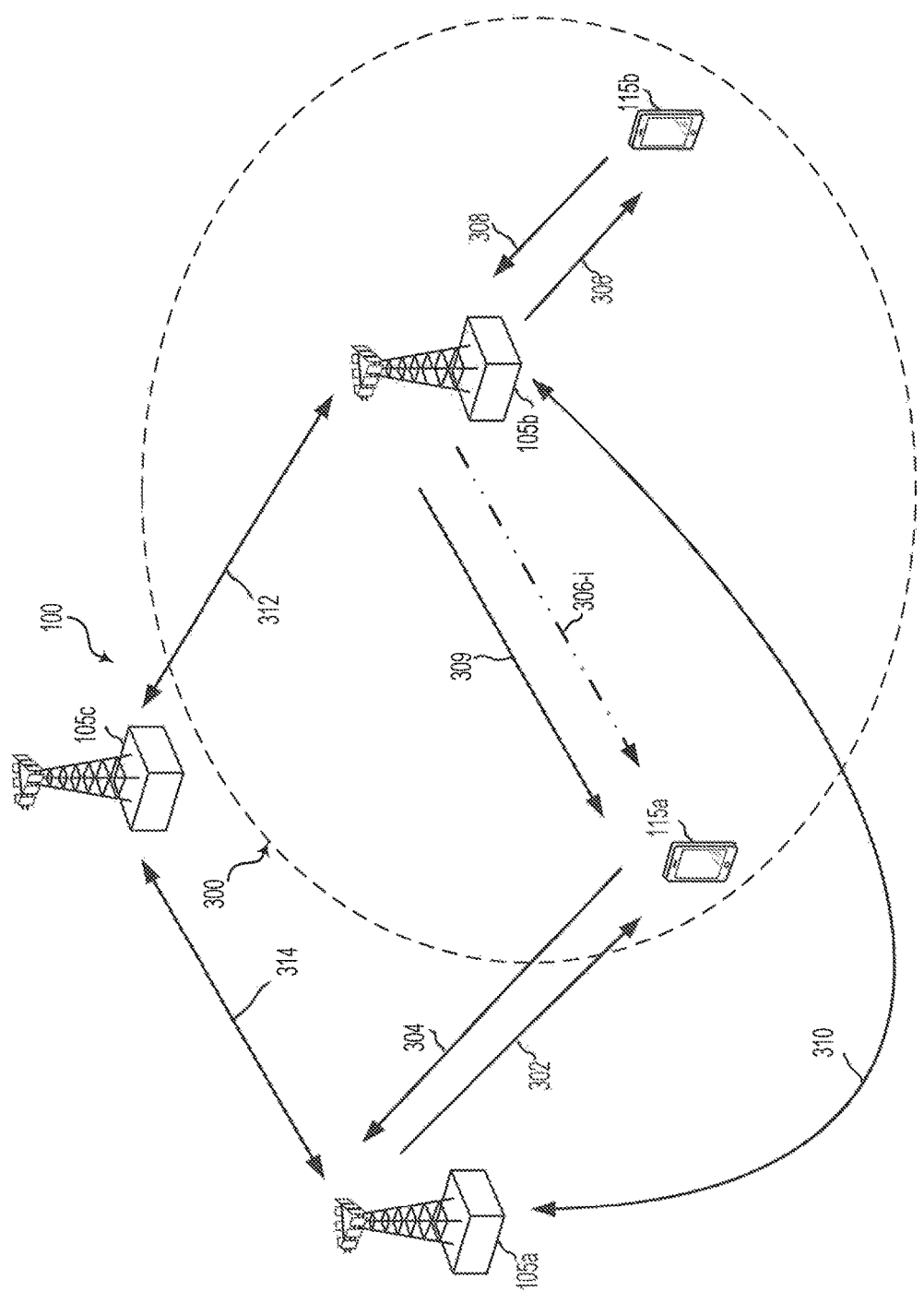
FIG. 3 is a block diagram illustrating interference among multiple cells according to some embodiments of the present disclosure.

FIG. 3 is a block diagram illustrating interference among multiple cells according to some embodiments of the present disclosure. gNB 105a may provide communication services to UE 115a, while gNB 105b may provide communication coverage 300 and serve UE 115b. gNB 105a, gNB 105b, and gNB 105c may communicate with each other through communication links 310, 312, and 314. gNB 105a may transmit downlink communications 302 to UE 115a, and receive uplink communications 304 from UE 115a. gNB 105b may transmit downlink communications 306 to UE 115b, and receive uplink communications 308 from UE 115b. Downlink communications 306 between gNB 105b and UE 115b may be overheard by UE 115a, which may be also located in communication coverage 300. For example, UE 115a may overhear interference communications 306-i.

UE 115a may be an advanced receiver that is capable of performing interference cancellation for transmissions from a neighboring cell served by a neighboring base station, such as gNB 105b. In order to perform interference cancellation, UE 115a may estimate transmission characteristics of gNB 105b and channels between UE 115a and gNB 105b, and demodulate transmissions from gNB 105b accordingly. Transmission characteristics may include one or more of: a transmission rank, precoder, a transmission mode, a transmission waveform, such as OFDM, SC-FDM, or interleaved frequency division multiplexing (IFDM), a transmission direction, such as uplink or downlink, a transmission content such as control or data, or the structure of mini-slot partitioning used during transmission. The transmission mode may include various transmission styles or coding types. For example, the transmission mode may include a space frequency block coding (SFBC) mode and a non-SFBC mode. Transmission characteristics may be further associated with certain transmission parameters, such as a slot type (UL/DL), a resource block group size, a number of control symbols, subcarrier spacing, a cell identification (ID), a virtual cell ID, or any combination thereof.

UE 115a may estimate transmission characteristics of gNB 105b based on pilot signals received from gNB 105b. Pilot signals may include various forms of reference signals, which may be signals generated based on known data. For example, a reference signal may be a primary synchronization signal (PSS), a secondary synchronization signal (SSS), a sounding reference signal (SRS), or a demodulation reference signal (DMRS). Therefore, efficient and effective transmissions of reference signals by gNB 105b may facilitate estimation of channels and transmission characteristics of gNB 105b. This may further improve efficiency of interference cancellation for transmissions from gNB 105b by UE 115a.

One of the aforementioned reference signals, DMRS, such as DMRS communications 309, is a signal to be used to demodulate transmissions received from gNB 105b. DMRS may include a sequence of symbols and so may also be referred to as a DMRS sequence. Each DMRS sequence may include at least one DMRS symbol. The DMRS sequence may be within a block of transmissions, such as a resource block (RB) or a resource block group (RBG), and have a finite set of possible values. The resource element (RE) locations of DMRS sequences within RBs and/or RBGs may depend on various transmission characteristics of gNB 105b. A set of REs having DMRS sequences may constitute a DMRS location pattern. Each set of REs may include various possible DMRS sequences. A DMRS sequence out of the various possible DMRS sequences may be further determined based on one or more of various parameters, such as a cell ID, a virtual cell ID, an RB index, a minislot duration, a minislot location within the slot, a slot index, a subframe index, a frame index, or any combination thereof.

For example, gNB 105b may transmit DMRS communications 309 which may be received by UE 115a. DMRS communications 309 may include one or more DMRS sequences. UE 115a may correlate each sequence hypothesis with the received DMRS communications 309 at RE locations corresponding to the hypothesis in order to identify DMRS communications 309 from gNB 105b. Moreover, UE 115a may acquire additional parameters, such as a cell ID of gNB 105b (e.g., via a synchronization search), to further identify the symbols in the received DMRS communications 309. If identification is successful, transmission characteristics or parameters of gNB 105b may be inferred. In some cases, multiple strong correlation peaks may be present. However, one or more of the transmission characteristics or parameters may still be inferred based on commonalities in the corresponding DMRS sequences.

In operation according to embodiments herein, gNB 105b may design DMRS sequences and/or DMRS locations, and transmit the designed DMRS sequences and/or DMRS locations in DMRS communications to be received by UEs, such as UE 115a. The designed DMRS sequences and/or DMRS locations in the aforementioned DMRS communications may be configured to minimize cross-correlation within a transmission block by UE 115a. Accordingly, UE 115a may estimate transmission characteristics of gNB 105b and channels between UE 115a and gNB 105b more effectively and efficiently based on the received DMRS sequences and/or DMRS locations.

In some cases, gNB 105b may determine different non-overlapping DMRS location patterns for different DMRSs with different transmission characteristics. Additionally or alternatively, gNB 105b may determine different non-overlapping DMRS sequence patterns for different DMRSs with different transmission characteristics. It should be appreciated that the different non-overlapping DMRS patterns of embodiments may, for example, be used at different times, simultaneously, etc.

In an example of the use of different non-overlapping DMRS location patterns for different DMRSs with different transmission characteristics, if the transmission mode of gNB 105b is an SFBC mode, UE 115a may receive an SFBC DMRS located on DMRS location pattern A. However, if the transmission mode of gNB 105b is a non-SFBC mode, UE 115a may receive a non-SFBC DMRS located on DMRS location pattern B. The DMRS location pattern A and DMRS location pattern B may indicate different sets of REs. Accordingly, UE 115a may be able to know the transmission mode of gNB 105b by identifying the DMRS location pattern received from gNB 105b. For a further example, as to the transmission direction, UE 115a may receive an uplink DMRS transmitted by UE 115b associated with PUCCH, PUSCH, or any uplink transmission channel on DMRS location pattern C, or a downlink DMRS transmitted by gNB 105b associated with PDCCH, PDSCH, or any downlink transmission channel on DMRS location pattern D. The DMRS location pattern C and DMRS location pattern D may indicate different sets of REs. Accordingly, UE 115a may be able to know the transmission direction of the transmission in the cell served by gNB 105b by identifying the DMRS location pattern received from gNB 105b. Since different DMRSs do not overlap to each other, cross-correlation may be avoided or minimized.

In an example of the use of different non-overlapping DMRS sequence patterns for different DMRSs with different transmission characteristics, gNB 105b may use orthogonal sequences for DMRS sequences located in the same set of REs. In other words, gNB 105b may use orthogonal DMRS sequences when DMRS sequences collide in a given set of REs. gNB 105b may determine different DMRS orthogonal sequences for different DMRSs indicating different transmissions characteristics. For example, assuming a precoding resource block group (PRG) includes four (4) consecutive physical resource blocks (PRBs), forty-eight (48) orthogonal sequences may be defined to be used for at least one DMRS sequence that occupies one OFDM symbol and spans all four (4) PRBs. The forty-eight (48) orthogonal sequences may be columns of a forty-eight (48)×forty-eight (48) DFT matrix or Hadamard matrix. Different DMRS sequences indicating different transmission characteristics may occupy different columns. For instance, a non-SFBC DMRS may use columns (1, 2, 3, 4), and an SFBC DMRS may use columns (5,6). Accordingly, UE 115a may be able to know the transmission mode of gNB 105b by identifying the DMRS sequence pattern received from gNB 105b. For a further example, as to the transmission direction, UE 115a may receive an uplink DMRS transmitted by UE 115b associated with PUCCH, PUSCH, or any uplink transmission channel on DMRS sequence pattern C, or a downlink DMRS transmitted by gNB 105b associated with PDCCH, PDSCH, or any downlink transmission channel on DMRS sequence pattern D. Such orthogonality with respect to the DMRS sequences may be used in combination with the above described non-overlapping aspect of DMRS sequences. Since orthogonal DMRS sequences located in the same set of REs are used, cross-correlation may be further minimized.

In an additional embodiment, the number of orthogonal DMRS sequences may be limited by the length of the DMRS sequence, for example, the maximum length of the DMRS sequence among the used orthogonal sequences. For example, the DMRS sequence of embodiments fits within the RBs allocated to the UE, and is configured so as not to fill those RBs (e.g., DMRS sequences may be selected as sequences of length N determined to facilitate remaining space within the RBs to accommodate data). Embodiments may bundle adjacent (e.g., in time and/or frequency) RBs to form larger blocks which share DMRS, allowing larger sequences (e.g., greater length N). It should be appreciated that there can be N mutually orthogonal sequences of length N. However, a plurality of different sets of N mutually orthogonal sequences may be provided in situations where the sequences are searched for in multidimensional space. For example, when searching for sequences in 3-dimensions, 3 orthogonal vectors (e.g., along x,y,z directions) are available such that there can be sets of at most 3 mutually orthogonal sequences (e.g., any common rotation applied to all the (x,y,z) directions). Nevertheless, the number of orthogonal DMRS sequences may vary dynamically or semi-statically based on various transmission characteristics, such as an RBG size.

In further embodiments, the same DMRS sequence may not be used in multiple RBs, RBGs, or PRGs in order to prevent the increase of peak-to-average power ratio (PAPR). The DMRS sequence used in an RB, RBG, or PRG may be a function of the RB, RBG, or PRG index. For instance, assuming forty-eight (48) orthogonal sequences are used as defined above, different columns may be used for different PRGs. The column index may be a function of PRG index. As an example, in PRG-0, a non-SFBC DMRS may use columns (1, 2, 3, 4), and an SFBC DMRS may use columns (5,6); in PRG-1, a non-SFBC DMRS may use columns (7, 8, 9, 10), and an SFBC DMRS may use columns (11, 12); and so on. The same columns for the same DMRS, such as an SFBC DMRS, may not repeat across PRGs.

Additionally or alternatively, in order to avoid the increase of PAPR, the symbols of the same DMRS sequence for multiple RBs, RBGs, PRGs may be scaled by a phase. The phase may be associated with the RB, RBG, or PRG. The phase may be a function of RB, RBG, or PRG index. For example, assuming forty-eight (48) orthogonal sequences are used and defined by i-th column of a forty-eight (48)×forty-eight (48) matrix, the symbols of a DMRS may be scaled by multiplying its j-th element by some phases. Within a given PRG, a given set of phases, which may be a complex number with absolute value of 1 ($p\_1$, $p\_2$, $p\_3$ ... $p\_48$), may be used for all columns. Accordingly, orthogonality can be preserved. As to multiple PRGs, the set of phases may be modified to be a function of PRG index in order to avoid using the same sequences across the multiple PRGs.

The examples as listed above regarding DMRS sequences are not intended to limit the scope of the present disclosure. For instance, different columns may be used by SFBC/non-SFBC DMRS. Different DMRSs indicating different transmission characteristics, such as a transmission rank, precoder, a transmission waveform, a transmission direction, a transmission content, or the structure of mini-slot partitioning used during transmission, may also utilize the above or similar sequence design. Also, different numbers of sequences, columns, and matrix types may be used.

In operation according to further embodiments herein, gNB 105a, gNB 105b, and gNB 105c in wireless network 100 may communicate with each other, via a backhaul and/or over-the-air, and share transmission characteristics with each other. For example, gNB 105b may share its transmission characteristics or parameters, such as a slot type, a resource block group size, a number of control symbols, utilization of mini-slot partitioning, subcarrier pacing, a cell ID, and a virtual cell ID, with gNB 105a and gNB 105c, via communication links 310 and 312, respectively. Therefore, UE 115a may obtain transmission characteristics or parameters of gNB 105b from gNB 105a and/or gNB 105c. The transmission characteristics or parameters of gNB 105b obtained from gNB 105a and/or gNB 105c may be helpful for UE 115a to control the number of DMRS sequence hypotheses (e.g., the gNB may relay information to the UE such that the UE may reduce the DMRS sequence hypotheses searched) and reduce cross-correlation among the restricted subset of hypotheses (e.g., the gNB may select its DMRS patterns based upon the information to reduce cross-correlation at the UE).

The transmission characteristics or parameters of gNB 105b may be dynamically or semi-statically signaled to UE 115a. For example, parameters that only change semi-statically may be semi-statically signaled in a radio resource control message, a system information block (SIB), a master information block (MIB), or a master system information block (mSIB). As a further example, a group-index may be dynamically signaled in downlink control information (DCI) while the groups of parameter values may be semi-statically pre-configured. Such signaling of parameters to the UE may, for example, be made directly to the UE by the gNB for which the parameters apply (e.g., gNB 105b to UE 115a) or may be relayed to the UE by another gNB (e.g., from gNB 105b to gNB 105a via backhaul, such as an X2 interface, and from gNB 105a to UE 115a).

In an additional aspect of the present disclosure, gNB 105b may share DMRS sequences to another cell that has tight coordination of scheduling across cells. Preferably, this cell may be also served by gNB 105b. This cell may directly signal DMRS sequences to UE 115a. However, this approach may increase the transmission overhead.

In further aspects of the present disclosure, gNB 105a, gNB 105b, and gNB 105c may be in Coordinated Multi-Point (CoMP) operation. CoMP is a general framework designed to reduce cell-edge interference, improve cell-edge spectrum efficiency and enlarge effective cell-edge coverage by means of multi-point coordination including coordination between various transmission entities, such as remote radio heads (RRHs), relays, and gNBs. For example, in CoMP, the data transmissions to be conveyed to UE 115a may be available at and transmitted from gNB 105a, gNB 105b, and gNB 105c in a CoMP cooperating set (the set of transmitters—gNBs, RRHs, relays, etc.—involved in communication with a given UE), whereas user scheduling and beamforming decisions may be made dynamically after the coordination among the points in the cooperating set. Therefore, in CoMP, UE 115a may receive transmission characteristics or parameters directly from gNB 105b. As such, UE 115a may not need to identify DMRS sequences and/or DMRS locations in order to determine transmission characteristics of gNB 105b.

In operation according to additional embodiments herein, UE 115a may provide or otherwise inform wireless network 100 regarding transmission information useful with respect to or otherwise desired for interference cancellation. The transmission information may include one or more transmission characteristics of neighboring base stations, such as gNB 105b, an indication of interference cancellation capabilities of UE 115a (e.g., a maximum rank of interference that UE 115a is capable to cancel), etc. UE 115a may inform wireless network 100 by signaling one or more gNBs in wireless network 100, such as gNB 105a, semi-statically or dynamically. In response, wireless network 100 may use this transmission information to decide which transmission parameters or characteristics to transmit to UE 115a, and how to transmit transmission parameters or characteristics to UE 115a (e.g., semi-statically or dynamically). The signaling between wireless network 100 and UE 115a may be semi-statically reconfigured. Under certain conditions, UE 115a may choose to disable part or all interference cancellation operations in order to save its power-consumption. Semi-static reconfiguration could be used when the UE disables or re-enables features of interference cancellation.

Figure 4:
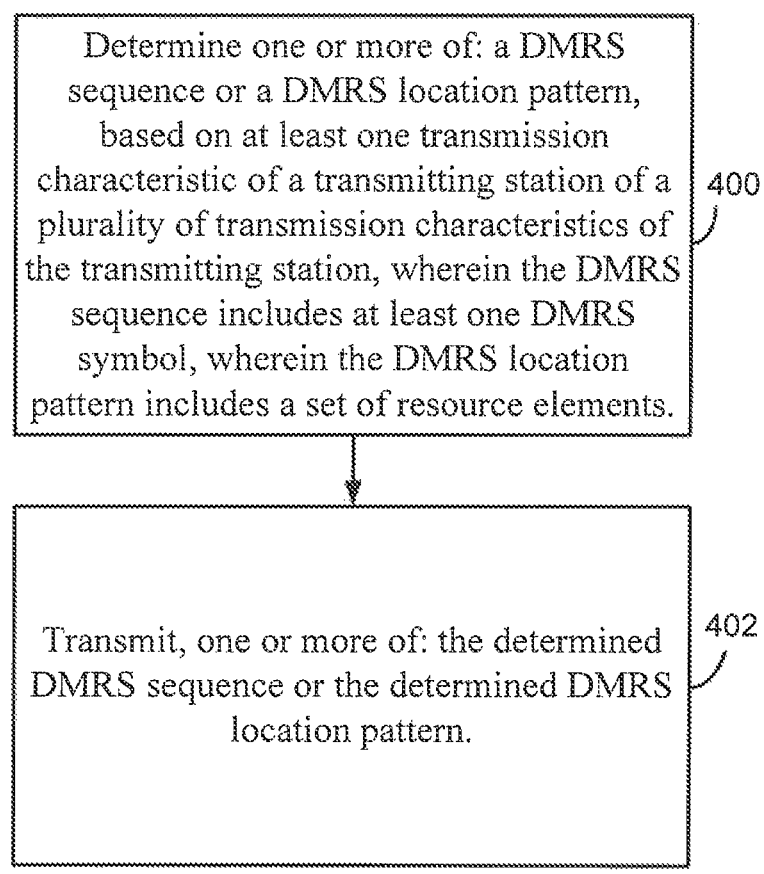
FIG. 4 is a functional block diagram illustrating exemplary blocks executed by a base station to implement one aspect of the present disclosure.

FIG. 4 is a functional block diagram illustrating exemplary blocks executed by a transmitting station (e.g., base station and/or UE operating to transmit data and/or control signals) to implement one aspect of the present disclosure. The example blocks may be implemented by logic of base station/gNB 105 and/or logic of UE 115, as illustrated in FIGS. 1-3. At block 400, the transmitting station (e.g., through operation of logic of controller/processor 240 and/or controller/processor 280) may determine one or more of: a DMRS sequence or a DMRS location pattern, based on at least one transmission characteristic of the transmitting station of a plurality of transmission characteristics of the transmitting station (e.g., transmission characteristics implemented by one or more of transmit processor 220, TX MIMO processor 230, and/or modulators 232a through 232t and/or transmit processor 264, TX MIMO processor 266, and/or modulators 254a through 254r). The DMRS sequence may include at least one DMRS symbol, and the DMRS location pattern may include a set of resource elements. Transmission characteristics may include one or more of: a transmission rank, precoder, a transmission mode, a transmission waveform, a transmission content, a transmission direction, or structure of mini-slot partitioning used during transmission. The transmission mode may include various transmission styles or coding types. For example, the transmission mode may include an SFBC mode and a non-SFBC mode. Transmission characteristics may be further associated with certain transmission parameters, such as a slot type, a resource block group size, a number of control symbols, subcarrier spacing, a cell ID, and a virtual cell ID. At block 402, the transmitting station may transmit (e.g., through operation of transmission characteristics implemented by one or more of transmit processor 220, TX MIMO processor 230, and/or modulators 232a through 232t under control of logic of controller/processor 240 and/or transmit processor 264, TX MIMO processor 266, and/or modulators 254a through 254r under control of logic of controller/processor 280) one or more of: the determined DMRS sequence or the determined DMRS location pattern. In response, the receiving station (e.g., UE and/or base station) may determine transmission characteristics of the transmitting station based on the received DMRS sequence or DMRS location pattern.

Figure 5:
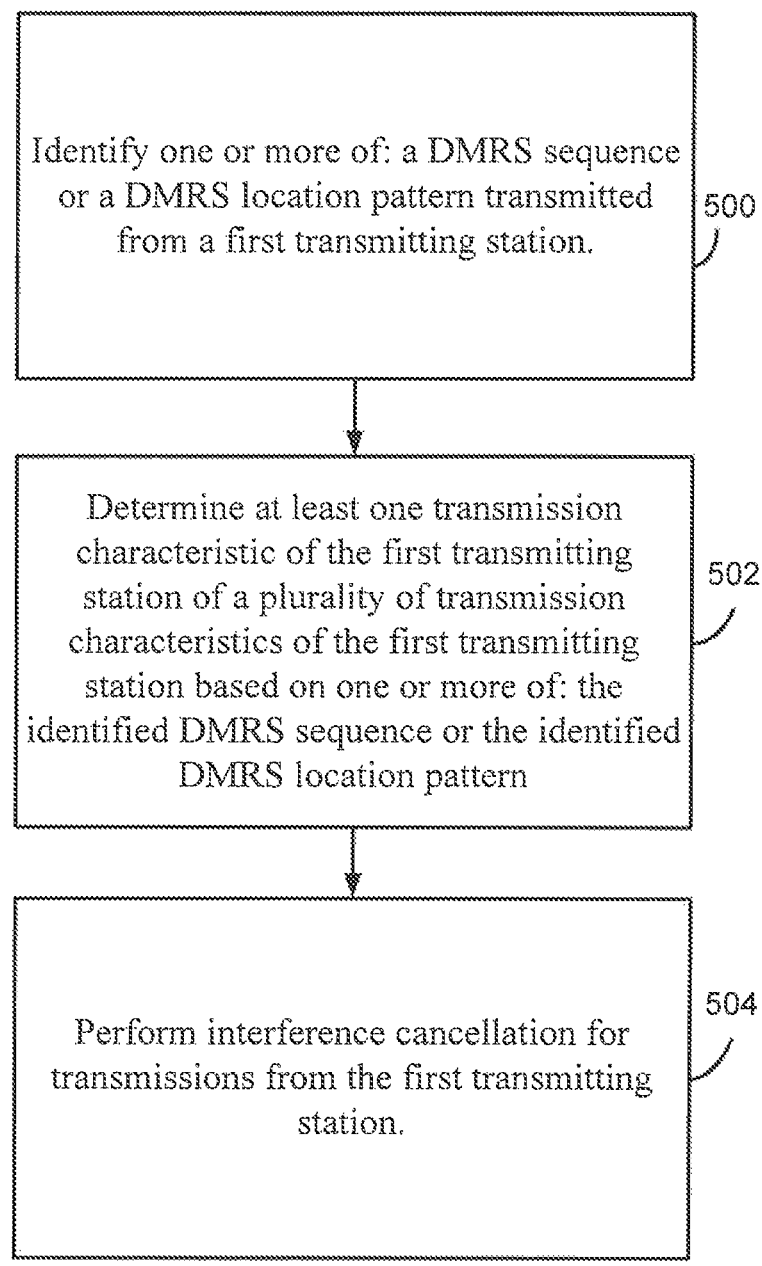
FIG. 5 is a functional block diagram illustrating exemplary blocks executed by a UE to implement one aspect of the present disclosure.

FIG. 5 is a functional block diagram illustrating exemplary blocks executed by a receiving station (e.g., UE and/or base station) to implement one aspect of the present disclosure. The example blocks may be implemented by logic of UE 115 and/or base station gNB 105, as illustrated in FIGS. 1-3. At block 500, the receiving station (e.g., through operation of logic of controller/processor 280 and/or controller processor 240) may identify one or more of: a DMRS sequence or a DMRS location pattern, from a first transmitting station. At block 502, the receiving station may determine at least one transmission characteristic of the first transmitting station of a plurality of transmission characteristics of the first transmitting station based on one or more of: the identified DMRS sequence or the identified DMRS location pattern. At block 504, the receiving station may perform interference cancellation (e.g., through operation of interference cancellation techniques implemented by one or more of demods 254a through 254r, MIMO detector 256, and/or receive processor 258 under control of logic of controller/processor 280 and/or demods 232a through 232t, MIMO detector 236, and/or receive processor 238 under control of logic of controller/processor 240) for transmissions from the first transmitting station. In additional aspects of the present disclosure, the receiving station (e.g., through operation of logic of controller/processor 280 and/or controller/processor 240) may estimate characteristics of a channel between the receiving station and the first transmitting station, and demodulate the transmissions from the first transmitting station.

Figure 6:
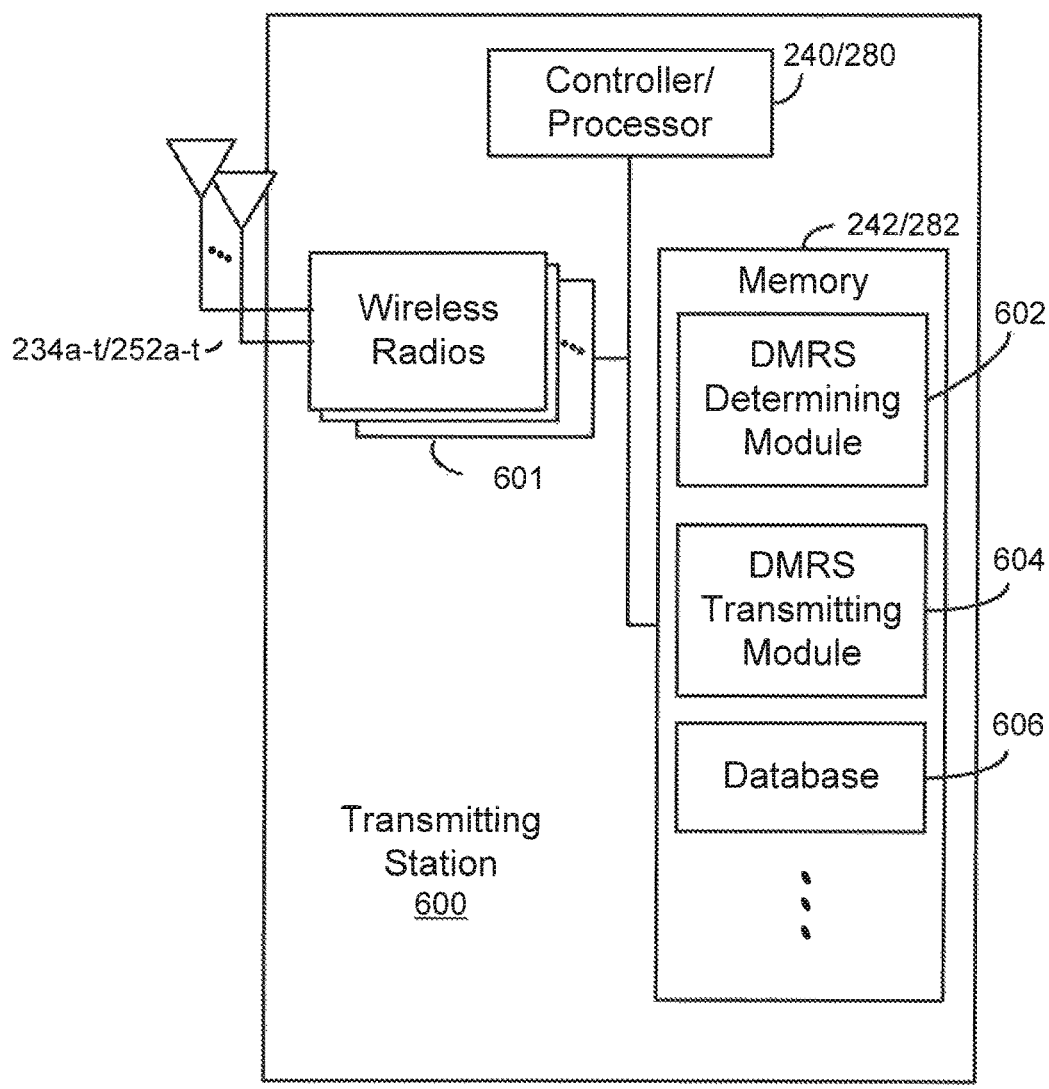
FIG. 6 is a block diagram of a base station in a communication network according to one aspect of the present disclosure.

FIG. 6 is a block diagram of transmitting station 600 in a communication network according to one aspect of the present disclosure. Transmitting station 600 may have the same or similar configuration as the configuration of base station/gNB 105 and/or UE 115, as illustrated in FIGS. 1-3. Transmitting station 600 may include controller/processor 240/280 to perform or direct the execution of various processes or program codes stored in memory 242/282. Transmitting station 600 may further include wireless radios 601 to process uplink or downlink signals received from antennas 234a-t/252a-r. Memory 242/282 may store program codes for execution of DMRS determining module 602, DMRS transmitting module 604, and/or other modules/applications by controller/processor 240/280 to provide operation as described herein (e.g., perform the functions of the exemplary blocks of FIG. 4). DMRS determining module 602 may, for example, provide logic used to determine one or more of: a DMRS sequence or a DMRS location pattern, based on at least one of a plurality of transmission characteristics. DMRS transmitting module 604 may, for example, provide logic used to transmit one or more of: the determined DMRS sequence or the determined DMRS location pattern to a receiving station.

Figure 7:
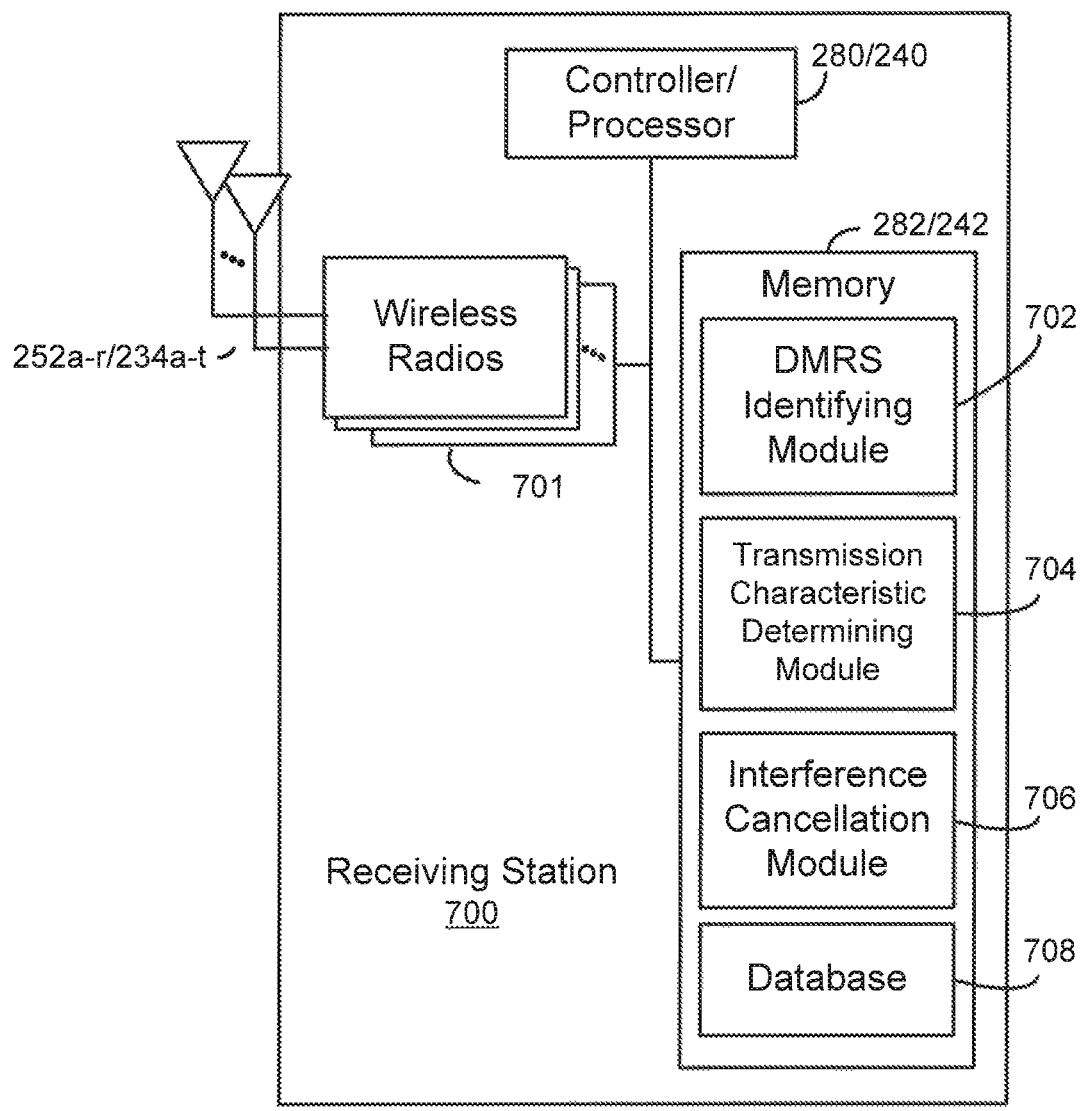
FIG. 7 is a block diagram of a UE in a communication network according to one aspect of the present disclosure.

FIG. 7 is a functional block diagram illustrating exemplary blocks executed by receiving station 700 to implement further aspects of the present disclosure. Receiving station 700 may have the same or similar configuration as the configuration of UE 115 and/or base station/gNB 105, as illustrated in FIGS. 1-3. Receiving station 700 may include controller/processor 280/240 to perform or direct the execution of various processes or program codes stored in memory 282/242. Receiving station 700 may further include wireless radios 701 to process uplink or downlink signals received from antennas 252a-r/234a-t. Memory 282/242 may store program codes for execution of DMRS identifying module 702, transmission characteristic determining module 704, interference cancellation module 706, and/or other modules and applications by controller/processor 280/240 to provide operation as described herein (e.g., perform the functions of the exemplary blocks of FIG. 5). DMRS identifying module 702 may, for example, provide logic used to identify one or more of: a DMRS sequence or a DMRS location pattern from a first transmitting station. Transmission characteristic determining module 704 may, for example, provide logic used to determine at least one of a plurality of transmission characteristics of the first transmitting station based on one or more of: the identified DMRS sequence or the identified DMRS location pattern. Interference cancellation module 706 may, for example, provide logic used to perform interference cancellation for transmissions from the first transmitting station. In an addition aspect of the present disclosure, interference cancellation module 706 may further provide logic used to perform channel estimation and demodulation of received transmissions from the first transmitting station.

Additionally, memory 282/242 of receiving station 700 may include database 708 stored with association between DMRS location patterns and transmission characteristics and association between DMRS sequences and transmission characteristics. Transmission characteristic determining module 704 may provide logic operable to determine transmission characteristics of the first transmitting station based on the identified DMRS sequence, the identified DMRS location pattern, and the association stored in database 708. Reciprocally, memory 242/282 of transmitting station 600 may also include database 606 stored with the same or similar association between DMRS location patterns and transmission characteristics and association between DMRS sequences and transmission characteristics. DMRS determining module 602 may provide logic operable to determine a DMRS sequence or a DMRS location pattern by referring to the association stored in database 606.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The functional blocks and modules in FIGS. 2 and 4-7 may comprise processors, electronics devices, hardware devices, electronics components, logical circuits, memories, software codes, firmware codes, etc., or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. Computer-readable storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, a connection may be properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. Disk and disc, as used herein, includes compact disc (CD), laser disc, optical disc, digital versatile disc (DVD), hard disk, solid state disk, and blu-ray disc where disks usually reproduce data magnetically, while discs reproduce data optically with lasers. Combinations of the above should also be included within the scope of computer-readable media.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C) or any of these in any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication, comprising:
   determining, by a base station based on at least one transmission characteristic of the base station of a plurality of transmission characteristics of the base station, one or more of a demodulation reference signal (DMRS) sequence including at least one DMRS symbol or a DMRS location pattern including a set of resource elements; and
   transmitting, by the base station, a DMRS using at least one of the one or more of the DMRS sequence or the DMRS location pattern.

2. The method of claim 1, wherein the plurality of transmission characteristics of the base station include one or more of:
   a transmission mode, wherein the transmission mode includes at least a space frequency block coding (SFBC) mode and a non-SFBC mode;
   a transmission waveform;
   a transmission content; or
   mini-slot partitioning structure used during transmission.

3. The method of claim 1, wherein the determining the DMRS sequence includes determining different DMRS sequences for different DMRSs indicating different transmission characteristics of the base station, wherein the different DMRS sequences are orthogonal to each other and located in a same set of resource elements.

4. The method of claim 1, wherein the one or more of the DMRS sequence or DMRS location pattern are determined to minimize cross-correlation within a transmission block by a user equipment (UE) receiving a transmission of the one or more of the DMRS sequence or the DMRS location pattern.

5. The method of claim 1, wherein the determining the DMRS sequence includes determining different DMRS sequences for different resource blocks or resource block groups.

6. The method of claim 5, wherein the determining the different DMRS sequences includes scaling the at least one symbol in the DMRS sequence by a phase, wherein the phase is associated with a resource block or a resource block group.

7. The method of claim 5, wherein the determining the different DMRS sequences includes providing different DMRS sequences so that a same DMRS sequence is not used in multiple of one or more of resource blocks (RBs), resource block groups (RBGs), or precoding resource block groups (PRGs) to avoid an increase of peak-to-average power ratio (PAPR).

8. The method of claim 1, wherein the determining the DMRS location pattern includes determining different DMRS location patterns for different DMRSs indicating different transmission characteristics, wherein the different DMRS location patterns do not overlap each other.

9. The method of claim 1, further comprising transmitting one or more transmission parameters to another base station, wherein the one or more transmission parameters include one or more of:
   a slot type;
   a resource block group size;
   a number of control symbols;
   structure of mini-slot partitioning;
   subcarrier spacing;
   a cell identification (ID); or
   a virtual cell ID.

10. The method of claim 9, further comprising transmitting the one or more transmission parameters in a coordinated multi-point operation.

11. A method of wireless communication, comprising:
    identifying, by a user equipment (UE), one or more of a demodulation reference signal (DMRS) sequence or a DMRS location pattern in a transmission from a first base station;
    determining, by the UE, at least one transmission characteristic of the first base station of a plurality of transmission characteristics of the first base station based on the one or more of the DMRS sequence or the DMRS location pattern; and
    performing, by the UE, interference cancellation for transmissions from the first base station.

12. The method of claim 11, further comprising receiving one or more transmission parameters of the first base station from a second base station or the first base station, wherein the one or more transmission parameters include one or more of:
    a slot type;
    a resource block group size;
    a number of control symbols;
    structure of mini-slot partitioning;
    subcarrier spacing;
    a cell identification (ID); or
    a virtual cell ID.

13. The method of claim 12, further comprising receiving the one or more transmission parameters from the first base station in a coordinated multi-point operation.

14. The method of claim 12, further comprising informing the second base station of transmission information desired for the interference cancellation from the first base station, wherein the transmission information includes one or more of: the one or more transmission parameters, or an indication of interference cancellation capabilities of the UE.

15. The method of claim 14, wherein the informing the second base station of the transmission information includes signaling the transmission information to the second base station dynamically or semi-statically.

16. An apparatus configured for wireless communication, the apparatus comprising:
- at least one processor; and
- a memory coupled to the at least one processor, wherein the at least one processor is configured:
  - to determine, by a base station based on at least one transmission characteristic of the base station of a plurality of transmission characteristics of the base station, one or more of a demodulation reference signal (DMRS) sequence including at least one DMRS symbol or a DMRS location pattern including a set of resource elements; and
  - to transmit, by the base station, a DMRS using at least one of the one or more of the DMRS sequence or the DMRS location pattern.

17. The apparatus of claim 16, wherein the plurality of transmission characteristics include one or more of:
- a transmission mode, wherein the transmission mode includes at least a space frequency block coding (SFBC) mode and a non-SFBC mode;
- a transmission waveform;
- a transmission content; or
- mini-slot partitioning structure used during transmission.

18. The apparatus of claim 16, wherein the configuration of the at least one processor to determine the DMRS sequence includes configuration to determine different DMRS sequences for different DMRSs indicating different transmission characteristics of the base station, wherein the different DMRS sequences are orthogonal to each other and located in a same set of resource elements.

19. The apparatus of claim 16, wherein the configuration of the at least one processor to determine one or more of the DMRS sequence or the DMRS location pattern are determined to minimize cross-correlation within a transmission block by a user equipment (UE) receiving a transmission of the one or more of the DMRS sequence or the DMRS location pattern.

20. The apparatus of claim 16, wherein the configuration of the at least one processor to determine the DMRS sequence includes configuration to determine different DMRS sequences for different resource blocks or resource block groups.

21. The apparatus of claim 20, wherein the configuration of the at least one processor to determine the different DMRS sequences includes configuration to scale the at least one symbol in the DMRS sequence by a phase, wherein the phase is associated with a resource block or a resource block group.

22. The apparatus of claim 20, wherein the configuration of the at least one processor to determine the different DMRS sequences includes providing different DMRS sequences so that a same DMRS sequence is not used in multiple of one or more of resource blocks (RBs), resource block groups (RBGs), or precoding resource block groups (PRGs) to avoid an increase of peak-to-average power ratio (PAPR).

23. The apparatus of claim 16, wherein the configuration of the at least one processor to determine the DMRS location pattern includes configuration to determine different DMRS location patterns for different DMRSs indicating different transmission characteristics, wherein the different DMRS location patterns do not overlap each other.

24. The apparatus of claim 16, wherein the at least one processor is further configured to transmit one or more transmission parameters to another base station, wherein the one or more transmission parameters include one or more of:
- a slot type;
- a resource block group size;
- a number of control symbols;
- structure of mini-slot partitioning;
- subcarrier spacing;
- a cell identification (ID); or
- a virtual cell ID.

25. The apparatus of claim 24, wherein the at least one processor is further configured to transmit the one or more transmission parameters in a coordinated multi-point operation.

26. An apparatus configured for wireless communication, the apparatus comprising:
- at least one processor; and
- a memory coupled to the at least one processor, wherein the at least one processor is configured:
  - to identify, by a user equipment (UE), one or more of a demodulation reference signal (DMRS) sequence or a DMRS location pattern in a transmission from a first base station;
  - to determine, by the UE, at least one transmission characteristic of the first base station of a plurality of transmission characteristics of the first base station based on the one or more of the DMRS sequence or the DMRS location pattern; and
  - to perform, by the UE, interference cancellation for transmissions from the first base station.

27. The apparatus of claim 26, wherein the at least one processor is further configured to receive one or more transmission parameters of the first base station from a second base station or the first base station, wherein the one or more transmission parameters include one or more of:
- a slot type;
- a resource block group size;
- a number of control symbols;
- structure of mini-slot partitioning;
- subcarrier spacing;
- a cell identification (ID); or
- a virtual cell ID.

28. The apparatus of claim 27, wherein the at least one processor is further configured to receive the one or more transmission parameters from the first base station in a coordinated multi-point operation.

29. The apparatus of claim 27, wherein the at least one processor is further configured to inform the second base station of transmission information desired for the interference cancellation from the first base station, wherein the transmission information includes one or more of: the one or more transmission parameters, or an indication of interference cancellation capabilities of the UE.

30. The apparatus of claim 29, wherein the configuration of the at least one processor to inform the second base station of the transmission information includes configuration to signal the transmission information to the second base station dynamically or semi-statically.

* * * * *